July 21, 1953  J. A. FREMON  2,646,154
COIN CONTROL DEVICE
Filed Nov. 16, 1946  5 Sheets-Sheet 1

INVENTOR:
JULES A FREMON
BY Rodney Bedell
ATTORNEY.

July 21, 1953 J. A. FREMON 2,646,154
COIN CONTROL DEVICE
Filed Nov. 16, 1946 5 Sheets-Sheet 2
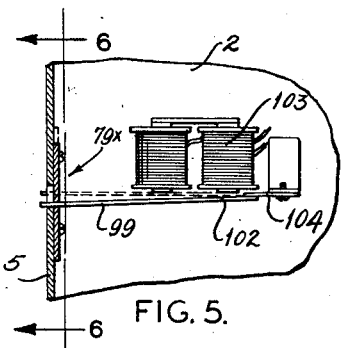
FIG. 5.
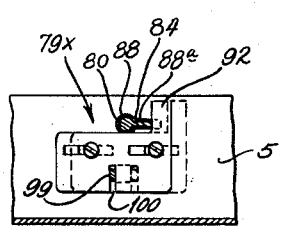
FIG. 6.
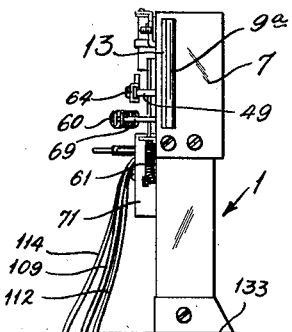
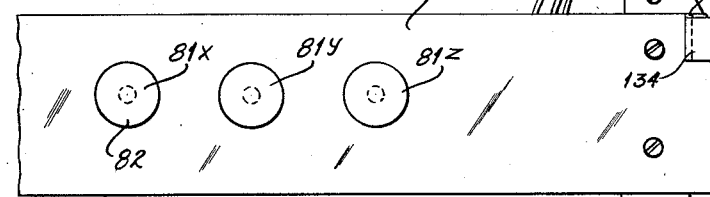
FIG. 3.
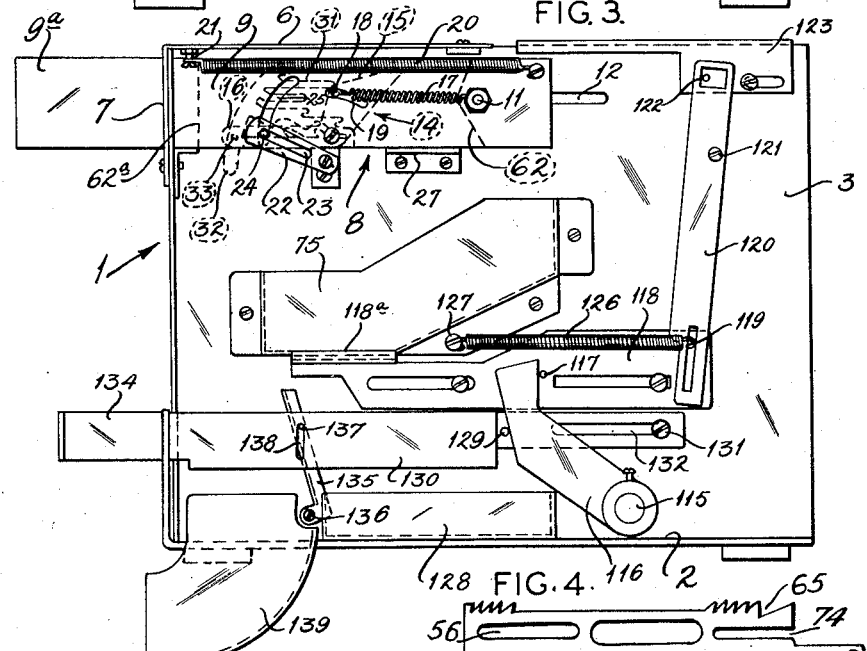
FIG. 4.
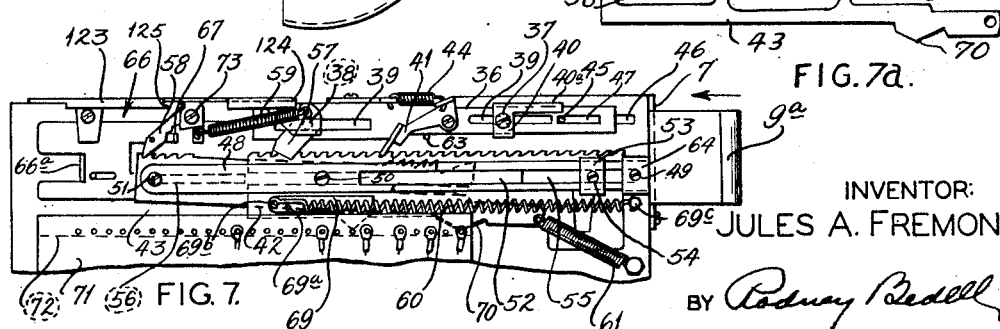
FIG. 7.   FIG. 7a.
INVENTOR:
JULES A. FREMON
BY Rodney Bedell
ATTORNEY.

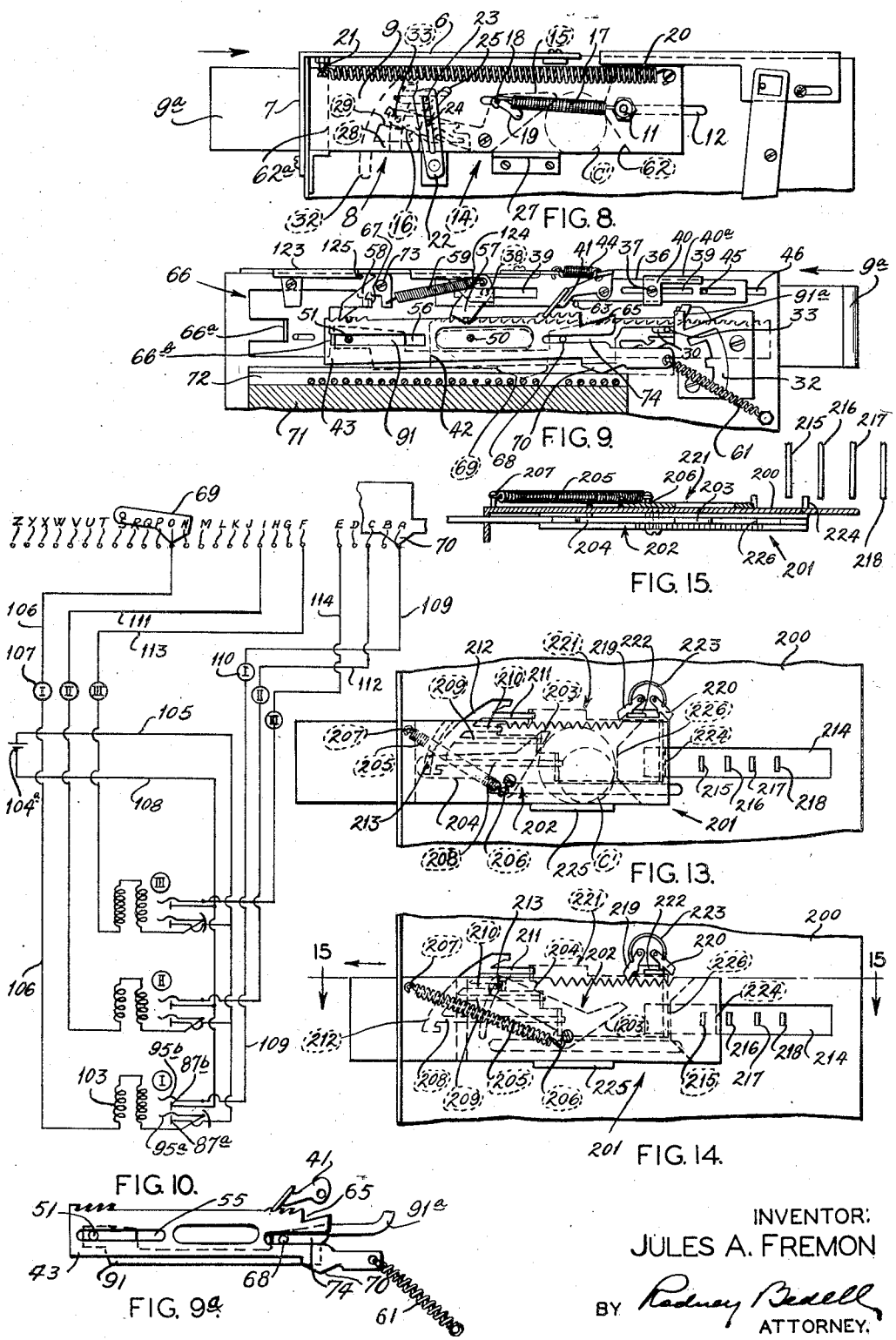

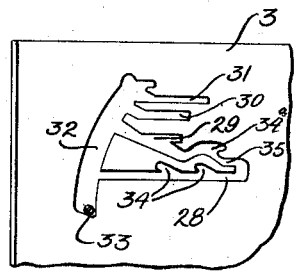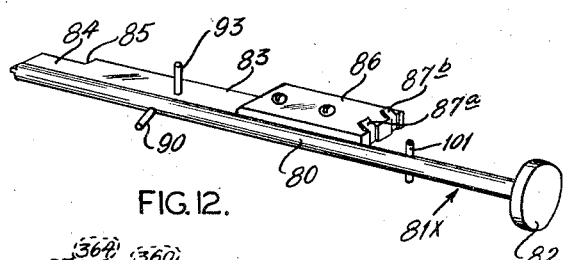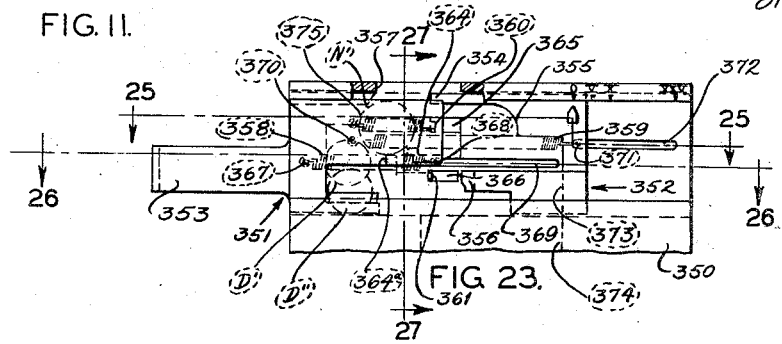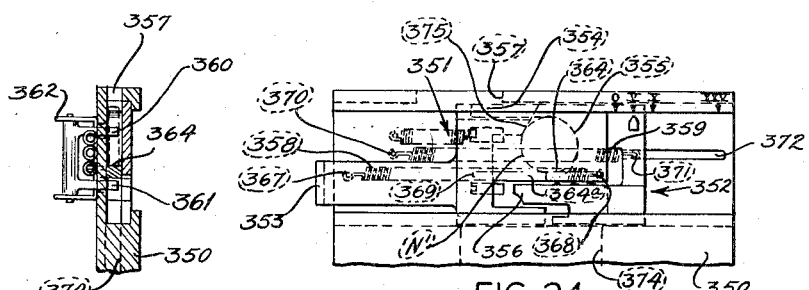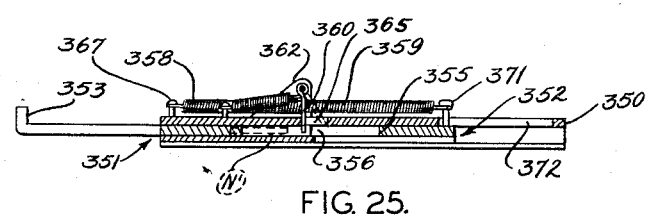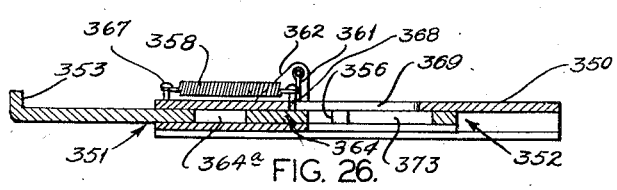

July 21, 1953  J. A. FREMON  2,646,154
COIN CONTROL DEVICE
Filed Nov. 16, 1946  5 Sheets-Sheet 5

INVENTOR:
JULES A. FREMON
BY Rodney Bedell
ATTORNEY.

Patented July 21, 1953

2,646,154

UNITED STATES PATENT OFFICE 2,646,154

COIN CONTROL DEVICE

Jules A. Fremon, St. Louis, Mo.

Application November 16, 1946, Serial No. 710,392

22 Claims. (Cl. 194—57)

The invention relates to coin devices adapted to control the operation of vending machines, change-making machines, mechanical cashiers, time switches, and other coin operated machines and has as an object to provide improved, highly flexible control of such machines.

The main object of the invention is to provide means whereby the sum of money required to operate a coin controlled machine may be made up of coins of any denomination, which may be deposited in the device in any order. This provision greatly amplifies the capacity of coin operated machines to serve an increased number of patrons because coin control devices, as used heretofore, usually were adapted to receive coins of only a single denomination, or, if mixed coins were acceptable, the number of coins of any single denomination that could be accommodated, was limited. In particular, it was impossible to provide for the deposit of an unlimited number of pennies when the sale price was more than a few cents, due to mechanical difficulties, which increase greatly as the number of steps of accumulating pennies increases, and because of limitation of the space available in commercial coin operated machines for installation of the coin control device. Both of these shortcomings are remedied by the present invention, thus making possible the setting of sales prices in odd cents, if desired, regardless of the amount of such price, and without restricting the number of coins of any denomination, including pennies, which may be deposited to make up such price.

Another object of the invention is to provide a coin device for controlling a machine in which the sales price of any such article or service may be changed from time to time without affecting the prices of other articles, such changes being made merely by shifting detachable electric conductors from one indexed terminal "price" post to another one, without the use of any tools. Such price changing provision greatly enhances the adaptability of coin operated machines, particularly vending machines, to meet and respond to competitive marketing conditions by changing prices to conform with such conditions. In coin operated machines as were used heretofore, the prices of all articles vended under control of a single coin device were the same, that is, a control device adapted to effect operation of the machine to deliver an article upon the deposit of five cents, could not also effect the delivery of different articles upon deposit of ten cents, or any amount other than five cents; and to change the price pattern of any such control device necessitated substantially the reconstruction of the mechanism, which in actual practice was impracticable.

Another object of the invention is to provide a coin control device which may be incorporated in conventional coin operated machines. The device is of such size as to enable it to be incorporated in substantially all conventional coin operated machines with only minor changes, if any, and without the necessity of materially enlarging the space required to accommodate the coin control mechanism employed in such machines. The device consists of a number of elements which may be grouped in assembled units to fit the requirements of any specific installation. Certain of the elements may be omitted from the assembled units according to the results desired to be accomplished by the control mechanism. For example, a unit to control a machine which gives change for each single coin as it is deposited, includes only the initial or single coin value-indicating elements, but a unit to control a machine which gives a coin of larger denomination, or an article or service, in exchange for several coins of smaller value, includes elements to accumulate, or "store," the value of such miscellaneous coins, as they are successively deposited, until "credit" is built up sufficiently to cover the value of the desired larger coin or article or service.

A further object of the invention is to provide a coin control device of simple construction and few parts which permit liberal manufacturing tolerances and requires no costly machining.

Other objects will be apparent from the following description and accompanying drawings, in which:

Figure 3 is a front view thereof.

Figure 4 is a side view of the device.

Figure 5 is a detail horizontal section taken approximately on line 5—5 of Figure 2, showing a lock for controlling the delivery mechanism for one stack of packages in a multi-stack vending machine, and which permits the operation of such mechanism only when a predetermined sum of money has been deposited in the device.

Figure 6 is a transverse vertical section taken approximately on line 6—6 of Figure 5.

Figure 7 is a detail side view showing the position of various parts of the device after a coin of multi-unit denomination has been deposited and the device is being operated.

Figure 7a is a detail view of a part shown in the assembly of Figure 7.

Figure 8 is a detail side view opposite to Figure 7 showing the position of the parts after a nickel has been deposited and the device is being operated.

Figure 9 is a view similar to Figure 7 showing the position of various parts when a penny has been deposited and the device is being operated.

Figure 9a is a detail of one of the parts shown in Figure 9.

Figure 10 is a schematic wiring diagram showing the electrical connections.

Figure 11 is a detail view of a portion of a side wall of the frame of the device drawn to enlarged scale and showing the slot pattern for limiting movement of a driver commensurate to the size and denomination of the coin deposited.

Figure 12 is a perspective of a plunger and associated parts to operate the delivery mechanism of a vending machine.

Figure 13 is a front view of a device showing another embodiment of the invention.

Figure 14 is a view similar to Figure 13 and shows the position of various parts when a nickel has been inserted in the device and it is being operated.

Figure 15 is a horizontal section taken approximately on line 15—15 of Figure 14.

Figure 23 is a front view of another embodiment of the invention.

Figure 24 is a view similar to Figure 23 showing the device during a cycle of operation.

Figures 25 and 26 are longitudinal horizontal sections taken approximately on the lines 25—25 and 26—26, respectively, of Figure 23.

Figure 27 is a transverse vertical section taken approximately on the line 27—27 of Figure 23.

In Figures 1-12, inclusive, there is shown an embodiment of the invention adapted to control the operation of a vending machine which dispenses packages from any desired number of columns, the control mechanism for three such columns only being shown for illustration, at prices ranging from one cent to $1.04, which may be deposited in coins of one, five, ten or twenty-five cent denominations, and in which the sale price for each column may be set at any amount within the range mentioned, and thereafter from time to time may be changed to any other figure within such price range. In this embodiment, a cycle of operation of the control mechanism comprises two phases, first, the positioning of certain parts to establish a desired "credit" relation of the parts upon the deposit of one or more coins in the device, and thereafter, the utilization of such parts in that relation, either by operating the controlled machine to deliver the desired package when the proper plunger is operated, provided the proper amount of credit has been established, or by returning the deposited coin or coins to the depositor, with restoration of all operating parts to their normal positions. In the following description, the parts which function during the first phase of the cycle and the operation of the device to the point where the "credit" is established will be set forth in detail before proceeding to describe the parts which function and the operation of the device during the second phase of the cycle. As an example, the vending machine is assumed to vend articles for forty-five cents.

Figures 1, 2:
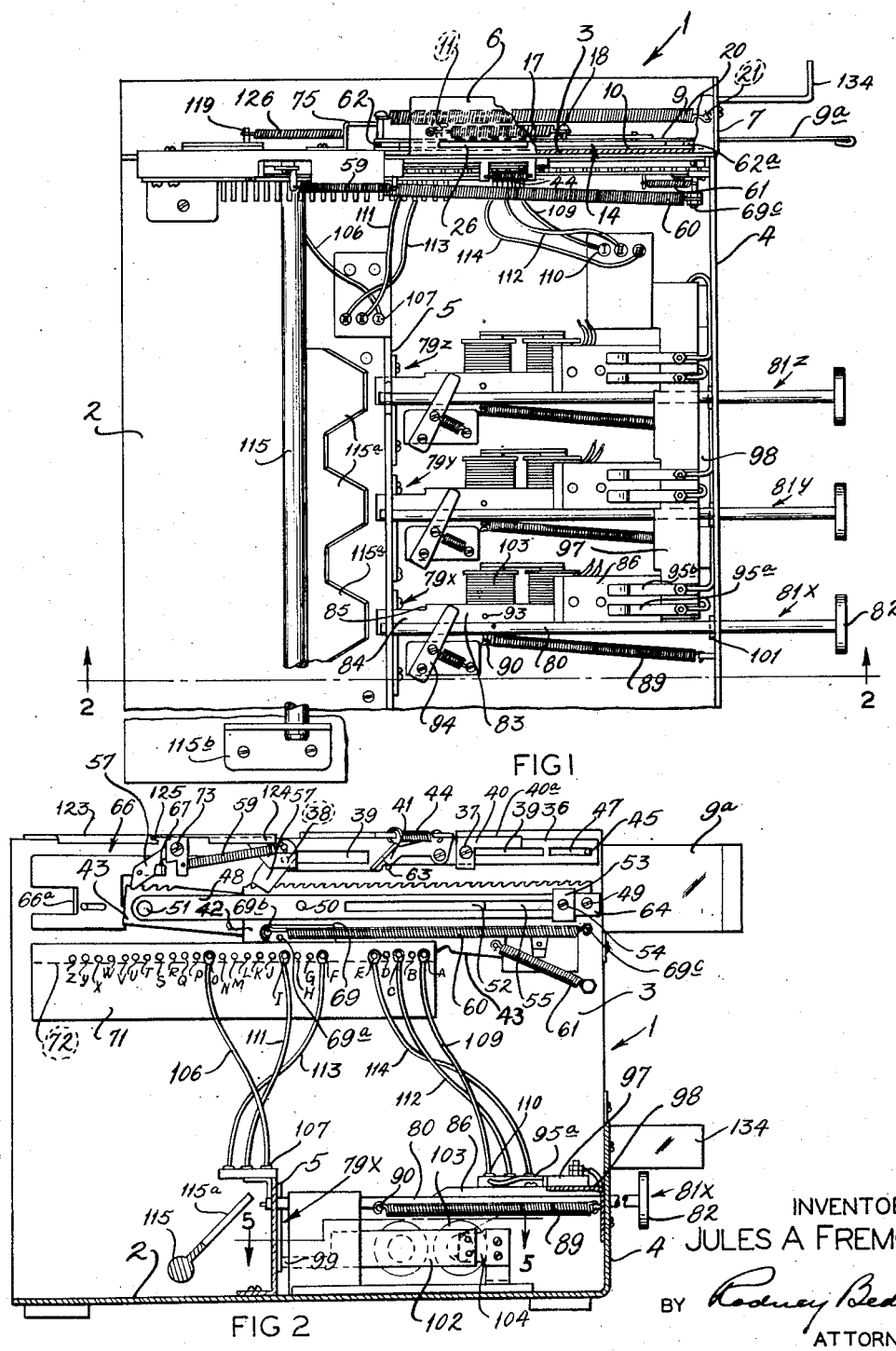
Figure 1 is a top view of a coin control device constructed according to the invention.
Figure 2 is a longitudinal vertical section taken approximately on the line 2—2 of Figure 1.

The device comprises a substantially L-shaped base or frame 1 including a horizontal wall 2, an upright side wall 3 and an upright front wall 4. An upright bracket 5 is attached to wall 2 and extends transversely from side wall 3 and parallel to front wall 4. Side wall 3 has horizontal and vertical flanges 6 and 7 (Figures 1 and 3).

A driver 8, comprising flat plates 9 and 10, spaced apart by blocks 62 and 62a, is attached slidably to the outer face of side wall 3 by a screw 11 (Figures 4, 8) extending through an elongated slot 12 in side wall 3 and by plate 9 extending outwardly through a vertical slot 13 (Figure 3) in flange 7 to form an operating handle 9a. Driver 8 is normally urged outwardly, i. e., to the right (Figure 1), by a tension spring 20 having one end attached to driver 8 and the other end attached to a pin 21 on flange 6. A pin 45 (Figures 2, 9), rigid with driver 8 and extending through an elongated slot 46 in side wall 3, limits outward movement of driver 8.

Pivoted to driver 8 between plates 9 and 10 is a bell crank 14 having arms 15 and 16. Bell crank 14 (Figures 4, 8) is urged in a clockwise direction (Figure 8) by a tension spring 17 having one end attached to screw 11 on driver 8 and the other end attached to a pin 18 on arm 15 and extending through a curved slot 19 in plate 9. An arm 22 pivoted to side wall 3 has an elongated slot 23 (Figures 4, 8) to receive a pin 24 attached to arm 16 of bell crank 14 and extending through a curved slot 25 in plate 9 of driver 8. As driver 8 is moved outwardly by spring 20, arm 22 moves bell crank 14 in a counterclockwise direction (Figure 4) against the tension of spring 17, so that, when driver 8 reaches the end of its outward travel, bell crank 14 is so positioned that a clearance exists between arm 15 thereof and block 62 slightly greater than the diameter of a twenty-five cent coin.

When a coin C' (Figure 4) of any denomination is deposited in a coin slot 26 in flange 6, the coin is received between spaced plates 9 and 10 of driver 8, within the space between bell crank arm 15 and spacing block 62, and rests on a ledge 27 rigid with side wall 3. When driver 8 is moved manually inwardly, bell crank 14 is rotated in a clockwise direction by spring 17 until arm 15 engages the coin and the coin, which has been rolling on ledge 27, engages spacing block 62 (Figure 8) thereby preventing further rotation of bell crank 14.

Side wall 3 has a series of slots 28, 29, 30 and 31 connected at their outer ends by a curved slot 32 (Figure 11) and arranged to selectively receive a pin 33 on arm 16 of bell crank 14 when coins of twenty-five, five, one and ten cent denominations, respectively, are deposited in the device, whereupon driver 8 may be moved inwardly a distance limited by the length of the slot which pin 33 enters. The positions of slots 28, 29, 30 and 31 correspond to the positions of pin 33 when the pivoting motion of bell crank 14 is arrested as the result of arm 15 engaging a coin of twenty-five, five, one or ten cent denomination, respectively, that is, when a quarter is deposited in the device and driver 8 is moved manually inwardly, pin 33 moves into slot 28; when a nickel is deposited, pin 33 moves into slot 29; when a penny is deposited, pin 33 moves into slot 30 and when a dime is deposited, pin 33 moves into slot 31.

The sole purpose of engaging the deposited coin on ledge 27 between arm 15 and spacing block 62, as described above, is to stop the clockwise rotation of bell crank 14 by tension spring 17 at such point as, upon slightly further inward movement of driver 8, will result in pin 33 entering the proper one of slots 28, 29, 30 or 31, according to the denomination or size of the deposited coin. After pin 33 has entered the proper slot, it is essential that the pressure of arm 15 against the coin be terminated so that, upon further inward movement of driver 8, the coin will roll off the end of ledge 27 and fall freely from driver 8 into a temporary coin receptacle 75 (Figure 4) attached to side wall 3 below ledge 27. To effect such termination of pressure of arm 15 on the coin, slots 28, 29, 30 and 31 are inclined slightly from the horizontal, their inner ends being lower than their outer ends, so that, while pin 33 moves freely into the entrance of any such slot, it immediately thereafter contacts the downwardly inclined upper side of the slot, and as it moves further, bell crank 14 is rocked slightly in a counter-clockwise direction, withdrawing arm 15 from contact with the coin.

If driver 8 is moved inwardly while no coin is deposited in the device to limit clockwise rotation of bell crank 14, driver 8 moves inwardly until pin 33 has moved past the entrances to slots 28, 29, 30 and 31 and engages the upper end of curved slot 32. When the travel of driver 8 is stopped by pin 33 engaging the upper end of slot 32, driver 8 will have moved over a distance so short that no movement is imparted to any subsequently operated part of the device.

An elongated bar 36 (Figure 2) is slidably attached to the inner face of side wall 3 by screws 37 and 38 extending through longitudinal slots 39 in the bar and by a U-shaped bracket 40 mounted on screw 37 and receiving bar 36 between its legs. A tail-like extension 40a of bracket 40 is formed of resilient material and bears upon bar 36 to dampen or brake movement of the bar.

Pivoted to bar 36 is a pawl 41 which is urged into engagement with a rack 43 by a spring 44 upon the deposit of a penny and is urged into engagement with a rack 42 upon the deposit of any larger denomination coin. As explained below, upon the deposit of a fifth penny in a series of penny deposits, the pawl engages both racks 42 and 43. The determination of such engagements is described below.

Bar 36 is moved forwardly to the left (Figure 7) or back to its normal position at extreme right (Figure 2) by pin 45 on driver 8 (which extends through longitudinal slot 46 in side wall 3 and through a slot 47 in bar 36) when pin 45 engages the left or right end of slot 47, respectively, there being a substantial amount of lost motion as between pin 45 and bar 36. When bar 36 is in its normal position at extreme right (Figure 2) as determined by screw 38 engaging the end of slot 39, pawl 41 is lifted out of engagement with racks 42 and 43 by a pin 63 rigid with side wall 3.

An elongated narrow plate 48 is spaced from and is attached rigidly to the inner face of side wall 3 by screws 49, 50 and 51. Rack 42 is positioned between plate 48 and rack 43 and is slidably supported at its forward end by screw 50, which extends through an elongated slot 52 in rack 42, and at its rear end by a U-shaped bracket 53 which receives plate 48 between its legs and is attached to rack 42 by a screw 54 extending through an elongated slot 55 in plate 48. Slot 52 is open at the forward end of rack 42 to receive screw 51 as rack 42 moves to the left (Figure 7). Rack 43 is positioned between rack 42 and the inner face of side wall 3 and the forward end of rack 43 is slidably and pivotally supported by screw 51 which extends through an elongated slot 56 in the forward end of rack 43. The rear end of rack 43 includes a projection 70 (Figures 7 and 10) which forms an electrical contact and normally rests upon and is slidably supported by one of five electrical contact pins, A to E. An arm 91 (Figures 9, 9a) is positioned between rack 43 and the inner face of side wall 3 and is supported pivotally at its forward end by screw 51. A pin 68, rigid with arm 91 and extending through a slot 74 in rack 43, slidably supports the rear end of rack 43 when rack 43 is pivoted above rack 42 as described below.

A flexible or yielding electrical contact member 69 (Figures 7 and 10) is attached to the forward end of rack 42 by a pin 69a and is urged downwardly into sliding engagement with a series of contact pins F to Z, inclusive, by a tension spring 60 having one end attached to a pin 69b on member 69 and the other end attached to a pin 69c rigid with side wall 3. Spring 60 also urges rack 42 to the right to its normal position (Figure 2). A tension spring 61 urges rack 43 to the right to its normal position with its rear end below rack 42. Movement of rack 42 to the right is limited by bracket 53 engaging a stop 64 mounted on screw 49 at the end of plate 48, and movement of rack 43 to the right is limited by the end of slot 56 (Figure 9) engaging screw 51, through a lip 66b on a member 66 which is slidably mounted on side wall 3, the lip projecting through slot 56. Racks 42 and 43 are held in advanced positions against tension of springs 60 and 61 by pawls 57 and 58 pivotally attached to the inner face of side wall 3 by screws 38 and 73, respectively. Pawls 57 and 58 are urged into engagement with racks 42 and 43 by a tension spring 59 attached at its ends to the pawls.

Electrical contact pins A to E, inclusive, and F to Z, inclusive, the two series being separated by a short space, are mounted in alignment in an elongated block 71 of insulating material attached to side wall 3. Block 71 has a longitudinal groove 72 to receive sliding contacts 69 and 70. Contact pins A to E are so spaced as to register with contact 70 on rack 43 and contact pins F to Z are so spaced as to register with contact member 69 on rack 42, as the racks are moved to their respective positions within the limits of their movements. When racks 42 and 43 are at their normal, or extreme right hand positions (Figure 2), contact 69 rests upon pin F (Figure 7) and contact 70 rests upon pin A. As will be explained below, contact pins A to Z are selectively employed to set up price patterns, and in order that the proper pin may be easily recognized, they are indexed as follows: A to E, inclusive (which represents cents), 0, 1, 2, 3 and 4; and F to Z, inclusive (which represent multiples of five cents), 0, 5, 10, 15, and so on to $1.00 for pin Z.

The parts above described comprise all of the principal elements which function to establish a "credit" corresponding to the value of a deposited single coin, or to the aggregate value of several coins deposited consecutively. Operation of the device up to the point where such credit is established will now be detailed. Upon the deposit of a nickel, driver 8 is moved manually inwardly whereupon the immediately ensuing clockwise rotation of bell crank 14 moves arm 15 into contact with the nickel, driving the nickel forward until it engages spacing block 62, thereby preventing further rotation of bell crank 14, which is now so positioned that pin 33 on arm 16 is aligned with slot 29 in side wall 3. With further inward movement of driver 8, pin 33 enters slot 29; shortly thereafter, pressure on the nickel by arm 15 is released and the nickel rolls off the end of ledge 27 and falls into temporary coin receptacle 75 and, at approximately this stage of the travel of driver 8, pin 45 engages bar 36 at the forward or inner end of slot 47 (Figure 7). Further movement of driver 8 carries pin 33 through slot 29 until pin 33 engages the inner end of slot 29, thereby preventing further movement of driver 8, which at this stage has, by means of pin 45, propelled bar 36 forwardly such distance that pawl 41, after dropping from pin 63 into engagement with the teeth of rack 42, has moved rack 42 forwardly a distance equal to one tooth of the rack. Rack 42 is held against retraction by pawl 57. The length of slot 29 is such as to permit movement of pin 33 therein for such distance as will result, ultimately, in the movement of rack 42 forwardly a distance equal to one tooth. The extent of displacement of rack 42 forwardly from its normal position, at the end of a coin-depositing movement of the parts, represents the "credit" on the rack in multiples of five cents for each tooth distance displaced.

After reaching the end of its inward movement and upon release of the manually exerted pressure, driver 8 is moved back to its normal position by spring 20, such movement serving to retract pin 33 from slot 29 into slot 32. So long as pin 33 is contained within any one of slots 28, 29, 30 or 31, clockwise rotation of bell crank 14 responsive to spring 17 is prevented by the engagement of pin 33 with the upper side of such slot, but when pin 33 passes out of any such slot into slot 32 (there being at this stage no coin to impede the movement of arm 15), bell crank 14 is rotated in a clockwise direction until pin 33 engages the upper end of slot 32.

After driver 8 is moved outwardly a distance sufficient to retract pin 33 from any one of slots 28, 29, 30 or 31 into slot 32, reverse movement of driver 8 inwardly is prevented by this action of bell crank 14. If driver 8 is jiggled back and forth without passing pin 33 out of slot 29 into slot 32, forward movement of rack 42, to set up more than a single unit of credit for each nickel deposited, is prevented because of the lost motion between driver 8 and bar 36. As driver 8 moves to its outer limit of movement, it moves bar 36 to its normal or home position.

Assume that a dime is then deposited, the cycle of operation is the same as in the case of a nickel, except that pin 33 enters slot 31, the length of which is such as to result finally in the forward movement of rack 42 a distance equal to two teeth of rack 42. If two coins are deposited, e. g., first a nickel and then a dime, rack 42 will be moved from its normal or home position a distance of three teeth, which represents the accumulation of a "credit" of fifteen cents on rack 42.

Assume that a quarter is now deposited, the cycle of operation is the same as in the case of a nickel, except that when driver 8 is moved inwardly, pin 33 enters slot 28, the length of which is such as to result finally in the forward movement of rack 42 a distance equal to five teeth of the rack, and except that additional provisions are required to prevent the setting up of false credits on rack 42 by jiggling driver 8 back and forth. To prevent such jiggling movements of driver 8 sufficint to affect forward movement of rack 42 by pawl 41, slot 28 has a plurality of tooth-like notches 34 (Figure 11) at its upper side for engagement by pin 33 to limit reverse movement of pin 33 through slot 28. The notches are spaced so that driver 8 cannot be moved backward a distance greater than the lost-motion travel of pin 45 on driver 8 in slot 47 of bar 36. When driver 8 is at the end of its inward movement, as determined by pin 33 engaging the inner end of slot 28, spring 17 pivots bell crank 14 in a clockwise direction (Figure 8) until pin 33 moves into a slot 35 (Figure 11) connecting the inner end of slot 28 with slot 29 near its inner end, whereupon pin 33 is moved freely through slots 35 and 29 into slot 32, permitting reverse movement of driver 8 to its normal position. During this movement of pin 33 through slot 35, jiggling of driver 8 sufficient to cause forward movement of bar 36 is prevented by a notch 34a at the upper side of slot 35, similar to notches 34 in slot 28, but arranged to prevent movement of pin 33 toward the inner end of slot 35 past notch 34a. When reverse outward movement of driver 8 has progressed where pin 33 enters slot 29, a forward movement of driver 8 is limited by pin 33 engaging the inner end of slot 29. This forward movement of driver 8 is insufficient to move bar 36 forwardly.

Assume that a penny is now deposited and driver 8 is moved inwardly, pin 33 enters slot 30 and in so doing engages a cammed extension 91a on the rear end of arm 91, pivoting arm 91 upwardly so that its pin 68 raises the rear end of rack 43 to a position higher than that occupied by rack 42. As driver 8 moves bar 36 inwardly, pawl 41 engages rack 43 but is held above and out of engagement with rack 42 (Figure 9). The length of slot 30 is such as to result finally in the forward movement of rack 43 a distance equal to one tooth of the rack, in which position rack 43 is held against reverse movement by pawl 58. When pin 33 is retracted from slot 30, coincident with the outward movement of driver 8 to its normal position, arm 91 and rack 43 drop so that contact 70 rests on pin B. There is now accumulated in the two racks a total "credit" of forty-one cents, of which forty cents is represented by rack 42 being positioned at a distance equal to eight teeth from its normal position, and one cent is represented by rack 43 being positioned at a distance equal to one tooth from its normal position. By successive deposits of three more pennies and corresponding repetition of the same cycle of operation, rack 43 is advanced to a position four teeth distant from its home position. When a fifth penny is deposited, pawl 41 enters a deeper notch 65 in front of the last tooth and arm 91 does not lift pawl 41 out of engagement with rack 42. Consequently, when pawl 41 is moved forward by bar 36, it moves both rack 42 and rack 43 forward a distance of one tooth. As rack 43 moves forward for the fifth time, its forward end engages a lip 66a on member 66 and a lip 67 on member 66 moves under pawl 58 and lifts and holds the pawl out of engagement with the teeth of rack 43 when member 66 is moved forwardly by rack 43, whereby rack 43 is moved rearwardly by spring 61. When pawl 41 is lifted out of engagement with rack 43 by pin 63 as driver 8 moves outwardly, rack 43 continues its rearward movement until it reaches its normal position. Just before rack 43 reaches its normal position, lip 66b on member 66, which projects through slot 56 of rack 43, is engaged by the closed forward end of slot 56, whereby member 66 is moved to the right (Figure 9), withdrawing lip 67 from engagement with pawl 58 and permitting pawl 58 to resume its normal position in engagement with the teeth of rack 43. Thus, upon the deposit of a fifth penny, rack 42 moves forward a distance equal to one tooth, thus setting up a "credit" (or an additional credit) of five cents on rack 42, and rack 43 automatically returns to its normal position.

After depositing a nickel, a dime, a quarter and five pennies, in any order, and repeated manual movements of slide 8, as described above, the total "credit" which is accumulated in the device is forty-five cents, represented solely by the position of rack 42 at a distance equal to nine teeth from its normal or home position. This accumulation would be the same for a corresponding total coin value irrespective of use of nine nickels, or forty-five pennies, or any suitable combination of nickels, dimes, pennies and a quarter.

In the embodiment described above, control of the associated vending machine mechanism is effected by means of electrically operated lock members 79x, 79y and 79z (Figure 1) which permit effective manual movement of package-delivery plungers 81x, 81y and 81z, respectively, only when the proper amount of money is deposited in the control device. Plungers 81x, 81y and 81z operate the package-delivery mechanism (not shown) of three columns of packages designated as columns I, II and III. Since the package-delivery plungers and associated parts are alike in construction and operation, only one of them, 81x, will be described. Plunger 81x comprises a round push-rod 80 (Figure 12) to which is affixed a push-button 82. Projecting horizontally from the upper side (Figure 1) of push-rod 80 is a fin like plate 83 having a reduced forward section 84 and a shoulder 85 at the point where plate 83 increases to its full width. Secured to the outward end of plate 83 is a non-conductor plate 86 having two electrical contact points 87a and 87b (Figure 10). Plunger 81x is slidably mounted in front wall 4 and bracket 5 (Figure 1), a hole 88 (Figure 6) in bracket 5 which accommodates push-rod 80 having a slot 88a extending horizontally therefrom of sufficient length to permit plate 83, at its widest section, to pass therethrough. Plunger 81x is urged outwardy by a tension spring 89 having one end attached to a pin 90 rigid with plunger 81x and the other end attached to front wall 4, the outward movement of plunger 81x being limited by a pin 101 (Figure 17) rigid with plunger 81x and engaging front wall 4. The distance through which plunger 81x may be moved inwardly depends upon the position of lock member 79x (Figure 6) slidably mounted on the front side of bracket 5 and having an upwardly extending finlike portion 92 which normally (when in "locked" position) lies across the outer end of slot 88a and intercepts shoulder 85 on plate 83, thus stopping inward movement of plunger 81x before it makes contact with the package-delivering elements of the machine. When lock member 79x is positioned at its right hand limit, indicated by dotted lines in Figure 6, its finlike portion 92 does not obstruct slot 88a so that plunger 81x may be moved freely to its extreme inner position, a distance desirable to operate the package-delivery mechanism (not shown) of the machine. To effect such operation of a machine, a pin 93 extends upwardly from plate 83 (Figure 1) and is positioned to engage and move an operating arm or trigger 94 when plunger 81x is moved to extreme inner position. Trigger 94 is representative of any conventional mechanism for delivering a package from the column or stack controlled by that single plunger and delivery mechanism.

Contact points 87a, 87b engage contact springs 95a, 95b (Figure 1), respectively, when plunger 81x is moved inwardly. Contact springs 95a, 95b are mounted on a block 97 of non-conductor material which is secured to an L-shaped bracket 98 attached to the inner face of front wall 4.

Lock member 79x is moved to plunger locking and unlocking positions and is held in these positions by a finger 99 (Figure 5) which passes through and cooperates with a slot 100 in lock member 79x (Figure 6). Finger 99 is an extension of an armature 102 positioned before the poles of an electro-magnet 103 mounted on base 2 (Figure 5). Armature 102 is mounted upon the free end of a flat spring 104 which urges armature 102 away from electro-magnet 103. By this arrangement, lock member 79x is held in locking position when no current is flowing through the coils of electro-magnet 103 and is moved to unlocking position when current flows through the coils.

The source of the current required to operate lock members 79x, 79y and 79z may be a 3- to 6-volt battery of dry cells 104a (Figure 10), or it may be taken from the usual house-lighting circuit stepped down to low voltage by an ordinary electric bell transformer, the wiring of the circuits being shown diagrammatically in Figure 10. Since the three circuits are alike, only the one is described which controls the mechanism (lock member 79x and plunger 81x) which effects delivery of a package from column I, it being assumed that the sales price of packages in this column is forty-five cents, and that the sum of forty-five cents has been deposited in the control device. A common lead wire 105 runs from battery 104a to contact point 87a, where the circuit normally is interrupted. Line wire 106 runs from contact spring 95a through the coils of electro-magnet 103 to an indexed terminal post marked I, 107, and continues from the post in the form of a flexible cable of such length that detachable contact may be made with any one of contact pins F to Z. For the purpose of illustrating the particular operation now being described, line wire 106 is shown as in contact with contact pin O. Common lead wire 108 runs from the other pole of battery 104 to contact point 87b where the circuit normally is interrupted. Line wire 109 runs from contact spring 95b to an indexed terminal post marked I, 110, and continues from the post in the form of a flexible cable with which detachable contact may be made with any one of contact pins A to E, such contact being shown as made with contact pin A. Contact member 69, attached to rack 42, rests upon contact pin O, and contact point 70, extending from rack 43, rests upon contact pin A. With racks 42 and 43 positioned as just outlined, when plunger 81x is moved inwardly a short distance, contact points 87a, 87b thereon are carried into engagement with contact springs 95a, 95b, respectively, thus closing a circuit through the coils of electro-magnet 103, electrical connection between contact pin O and contact pin A being established through contact member 69 and contact point 70, respectively, which have electrical connection through racks 42 and 43 and the metallic parts of the device. Current flowing through this circuit energizes electro-magnet 103 which attracts armature 102 and, by means of finger 99, moves lock member 79x to the right (Figure 6), thus permitting a full inward movement of plunger 81x to effect the delivery of the desired package from column I. Full inward movement of plunger 81x can be made only when racks 42 and 43 are positioned so that their respective contacts are in engagement with the respective contact pins which serve as terminals for line wires 106, 109 and since line wire 106 may be attached to any one of contact pins F to Z, inclusive, and line wire 109 may be attached to any one of contact pins A to E, inclusive, the sales price, or the amount which must be deposited in the device to effect the delivery of a package from column I, may be set at any figure from zero (free) to $1.04.

Each one of the several electrical circuit patterns which may be set up to control their respective package-delivery mechanism, is entirely disassociated from any other circuit, this feature being illustrated in Figures 2 and 10, which show line wires 111 and 112 attached, respectively, to contact pins I and C, thereby requiring the deposit of seventeen cents in the device to effect delivery of a package from column II, while line wires 113 and 114, respectively, are attached to contact pins F and E, thereby requiring the deposit of four cents in the device to effect delivery of a package from column III. It is possible to establish a different sales price for each column of packages or to make the sales prices of any two or more columns the same, as for example, line wires 111 and 112 may be attached to contact pins O and A, thereby establishing the same price (forty-five cents) for both columns I and II. Finally, the number of delivery columns or stacks which may be controlled by a single coin device theoretically is unlimited, and in practice, is governed only by commercial considerations relating to such questions.

When either one of plungers 81x, 81y and 81z is moved inwardly its full distance, coincident with the delivery of a package from the column controlled by it, the inner end of the plunger engages an upstanding ear 115a (Figure 1) rigid with a shaft 115 supported pivotally by side wall 3 and by a bracket 115b attached to base 2. As shaft 115 pivots, responsive to the pressure on ear 115a, an arm 116 (Figure 4) rigid with shaft 115 and positioned adjacent to the outer face of side wall 3 engages a pin 117 on an elongated member 118 mounted slidably on the outer face of side wall 3. When member 118 moves to the right, a pin 119 rigid therewith engages an arm 120 mounted pivotally on side wall 3 by a pin 121 and pivots arm 120 which engages a pin 122 on a member 123. Member 123 is slidably mounted on the outer side of side wall 3 and has a shelf-like portion which extends over the top of side wall 3 and downwardly on the inner side (Figure 9) to provide operative surfaces 124, 125 which engage pawls 57 and 58, respectively, when member 123 is moved to the right by arm 120 and lifts the pawls out of engagement with racks 42 and 43, respectively, thereby permitting both racks to be moved to their normal positions by tension springs 60, 61, respectively, to clear any "credit" from the device. When plunger 81x is released and pressure on ear 115a ceases, all of the co-acting parts just described are returned to their normal positions by a tension spring 126, one end of which is attached to pin 119 on member 118, the other end being attached to a screw 127 rigid with side wall 3, whereupon pawls 57 and 58 drop to their normal positions in engagement with racks 42 and 43, respectively. The upper left end of member 118 (Figure 4) is extended horizontally and provides a sliding floor 118a for temporary coin receptacle 75 so that when member 118 is moved to the right, any coins which may be contained in coin receptacle 75 drop into a coin box 128 attached to side wall 3 and wall 2 below temporary coin receptacle 75. The movements of all of the parts resulting from pressure exerted against ear 115a, as just described, may be duplicated without pressure on ear 115a, at any time, by exerting pressure directly against arm 116 (Figure 4) by a pin 129 rigid with a push-plate 130 slidably mounted on the outer side of side wall 3 by a capped pin 131 rigid with side wall 3 and extending through an elongated slot 132 in the inner end of push-plate 130. Push-plate 130 extends outwardly through a vertical slot 133 in front wall 4, and the extended portion of push-plate 130 provides an operating handle 134 therefor. A movable gate 135 mounted pivotally by a pin 136 on the outer face of side wall 3, and positioned between push-plate 130 and side wall 3, has an operative connection with push-plate 130 through a pin 137 rigid with gate 135 which extends through a slot 138 in push-plate 130, whereby gate 135 is pivoted to the right coincidently with movement of push-plate 130 to the right, to divert any coins which may drop out of temporary coin receptacle 75 into a coin-return chute 139 which extends outwardly from side wall 3 (and to the outside of the vending machine cabinet). By operating push-plate 130 at any time after one or more coins have been deposited and are received in temporary coin receptacle 75, the depositor may effect the return of the coin or coins. Operation of push-plate 130 also extinguishes all credits which were set up in the device and returns all parts to their normal positions in the same manner as if the device were cleared by the delivery of a desired package.

In Figures 13, 14 and 15, there is shown a device which operates after the insertion of only a single coin and which may be used to operate a coin changing machine whereby a coin of large denomination is exchanged for coins of smaller denominations. The device comprises a base 200 with a driver 201 slidably mounted thereon. A bell crank 202 with arms 203 and 204 is pivoted to driver 201. Driver 201 is urged to the left and bell crank 202 is urged in a clockwise direction (Figures 13 and 14) by a tension spring 205 having one end attached to a pin 206 on bell crank 202 and the other end attached to a pin 207 on base 200. When a coin C' is inserted in driver 201, the coin rests on a ledge 225 and, as driver 201 is moved manually to the right (Figure 14), bell crank 202 pivots in a clockwise direction until arm 203 engages the coin and the coin abuts a shoulder 226 on the driver. Base 200 has a series of slots 208, 209, 210 and 211 connected at their outer ends by a curved slot 212 and arranged to selectively receive a pin 213 on arm 204 of bell crank 202 when coins of fifty, twenty-five, five and ten cent denominations, respectively, are deposited in the device, whereupon driver 201 may be moved to the right relative to base 200 a distance susbtantially equal to the length of the slot which pin 213 enters. The operation of the parts described above is similar to the operation of the corresponding parts in the previous embodiment.

The positions of slots 208, 209, 210 and 211 correspond, respectively, to the positions of pin 213 when bell crank 202 pivots into engagement with coins of fifty, twenty-five, five and ten cent denominations. The slots corresponding to coins of larger denominations are longer than those corresponding to coins of smaller demonimations, but the lengths of the slots are not necessarily in proportion to the denominations of the coins.

As driver 201 is moved to the right, a lip 224 extending through an elongated slot 214 in base 200 trips operating triggers 215, 216, 217 and 218 of a series of coin ejectors (not shown), the number of triggers engaged and operated being determined by the movement of driver 201. Operating trigger 215 may actuate a coin ejector which emits five pennies, trigger 216 emits one nickel, trigger 217 emits three nickels and trigger 218 emits one quarter. When a nickel is deposited in the device, pin 213 on bell crank 202 enters slot 210 as driver 201 moves to the right. Movement of the driver is limited by the length of slot 210 so that lip 224 trips operating trigger 215 only and five pennies are emitted by the affected coin ejector. When a dime is deposited, pin 213 enters slot 211, the lentgh of which permits driver 201 to move a distance sufficient to trip operating triggers 215 and 216 and five pennies and one nickel are emitted by the two affected ejectors. When a quarter is deposited, pin 213 enters slot 209 and driver 201 trips operating triggers 215, 216, and 217, whereupon five pennies, one nickel and three nickels are emitted from the respective ejectors. When a half dollar is deposited, pin 213 enters slot 208 and driver 201 trips operating triggers 215, 216, 217 and 218, whereupon five pennies, one nickel, three nickels and one quarter are emitted by the respective ejectors.

To prevent repeated tripping of operating triggers 215, 216, 217 and 218 by alternate movement of driver 201 to the right and left after a coin has been deposited, the upper edge of driver 201 is toothed for engagement by pawls 219 and 220 to prevent movement of the driver in a direction opposite to that in which it is being moved until it has moved to its limit in that direction.

When driver 201 is at its extreme left hand position (Figure 13), pawl 219 is raised out of engagement with driver 201 against tension of a curved spring 223 by a shoulder 222 on a slide 221 attached slidably to base 200. Pawl 220 is urged by curved spring 223 into engagement with driver 201.

As driver 201 is moved to the right, pawl 220 prevents the driver being moved to the left until pin 213 on bell crank 202 is moved to the end of the slot in which it is positioned and engages slide 221 which is stepped at its end adjacent slots 208, 209, 210 and 211 so as to extend across the inner ends of the slots.

When pin 213 engages a step on slide 221 and moves the slide to the right, shoulder 222 releases pawl 219 whereupon pawl 219 is urged by spring 223 into engagement with driver 201.

Shoulder 222 raises pawl 220 out of engagement with driver 201 against the tension of spring 223.

As driver 201 is moved to the left (Figure 14) pawl 219 rides over the teeth on driver 201 and prevents reverse movement of the driver until the driver is moved to its extreme left hand position as shown in Figure 13.

The device shown in Figures 16-22 may be used to control a vending machine operated electrically and adapted to vend articles from a single column at a price which may be varied from one cent to twenty-five cents.

The device comprises a frame or base 301 having an elongated aperture 302 in which a driver 303 is slidably mounted by a bracket 304 attached to frame 301 and by strips 305 attached to the inner end of driver 303 and engaging the frame at the sides of the slot. Driver 303 comprises a pair of spaced plates 335 and 336 and normally is urged to the left (Figure 16) by a tension spring 306.

Mounted pivotally on the front face of driver 303 is a part 310 having a rigid arm 311 positioned between plates 335 and 336 and arranged for engaging a coin C' inserted between the plates. Part 310 is biased to pivot in a counterclockwise direction (Figure 17) by a tension spring 315. When driver 303 is in its extreme left hand position, as in Figure 16, a pin 314 on part 310 engages a cam surface 313 on a bracket 312 attached rigidly to frame 301, and part 310 pivots in a clockwise direction against tension of spring 315. As the driver is moved to the right (Figure 17), pin 314 moves out of engagement with bracket 312 and part 310 is pivoted by spring 315 in a counterclockwise direction until arm 311 engages the coin. The angle through which part 310 pivots is determined by the diameter of the deposited coin.

Figure 17:
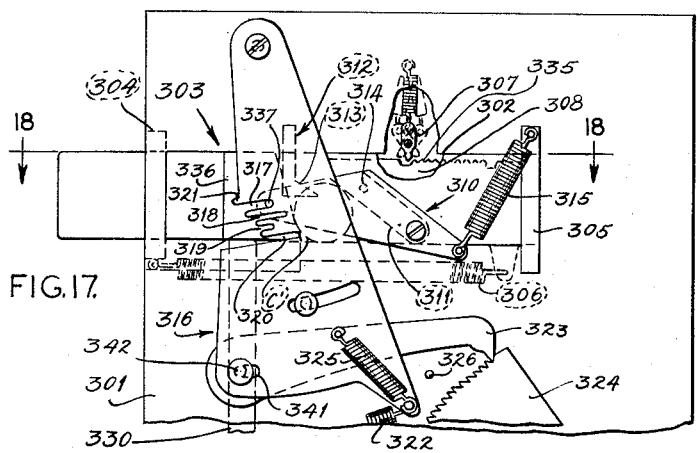
Figure 17 is a detail view similar to Figure 16 and showing the device during a cycle of operation.
Figure 16:
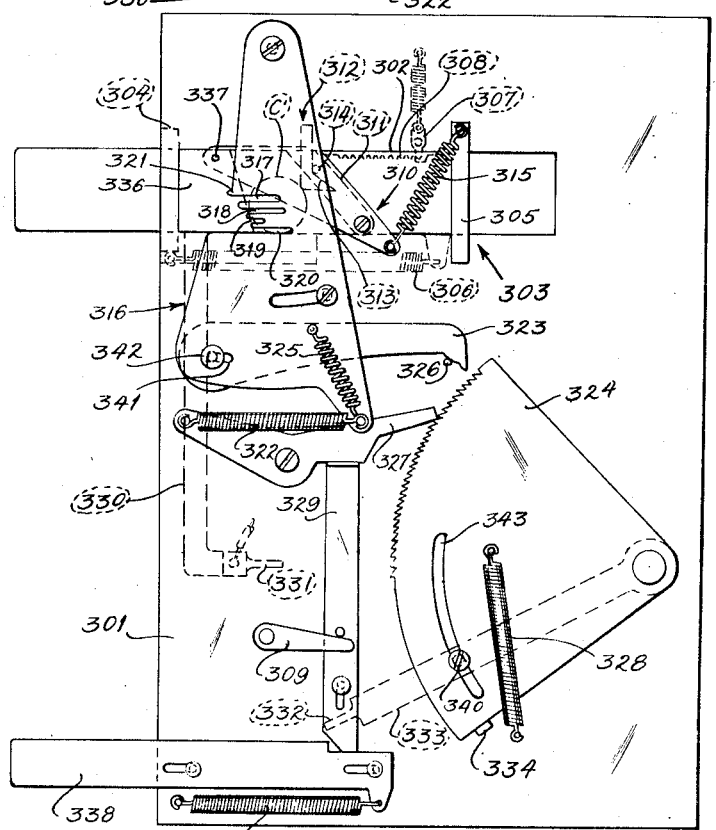
Figure 16 is a front view of another embodiment of the invention.
Figure 18:
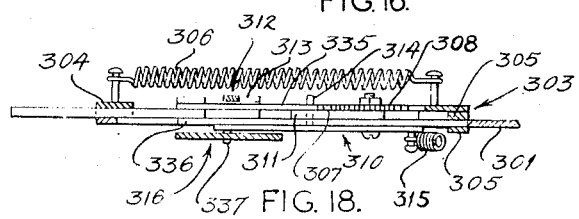
Figure 18 is a horizontal section taken approximately on line 18—18 of Figure 17.
Figure 19:
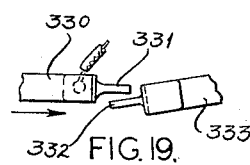
Figures 19, 20, 21 and 22 show various positions of the electrical contacts for controlling an associated machine during a cycle of operation.

A driven member 316 is attached pivotally at its upper end to frame 301 and is urged in a clockwise direction by a spring 322. Member 316 has a series of substantially horizontal slots 317, 318, 319 and 320 of various lengths and a lip 321 arranged for selectively cooperating with a pin 337 on part 310 when driver 303 is moved to the right (Figure 17). The vertical positions of lip 321 and slots 317, 318 and 319 correspond to the positions assumed by pin 337 when coins of twenty-five, five, one and ten cent denominations, respectively, are deposited in the device and driver 303 is moved to the right. If the deposited coin is a quarter, pin 337 on part 310 engages lip 321; if a nickel, pin 337 enters slot 317; if a penny, slot 318; if a dime, slot 319. If no coin is deposited, then pin 337 enters slot 320.

Lip 321 and the lengths of slots 317, 318 and 319 determine the angular movement of driven member 316 by driver 303 which is proportional to the denominations of the deposited coins.

In the embodiments in Figures 1-12 and 13-15, described above, movement of the driver is determined by the size or denomination of the coin deposited, but in the present embodiment, movement of the driver is the same irrespective of the size or denomination of the coin and only movement of the driven member is determined by the size or denomination of the deposited coin.

Driven member 316 has a pawl 323 attached pivotally thereto by a pin 342 and urged into engagement with a ratchet wheel 324 by a tension spring 325 to rotate the ratchet wheel in a clockwise direction when driven member 316 is pivoted in a clockwise direction by driver 303. Pawl 323 normally is held out of engagement with ratchet wheel 324 by a pin 326 attached to frame 301. A spring 328 urges ratchet wheel 324 to rotate in a counterclockwise direction and ratchet wheel 324 normally is prevented from rotating in that direction by a pawl 327 held in engagement with ratchet wheel 324 by spring 322. Pawl 327 is moved out of engagement with ratchet wheel 324 by a latch 329 slidably mounted on frame 1 whereby ratchet wheel 324 is rotated by spring 328 in a counterclockwise direction until ratchet wheel 324 engages a stop 334 rigid with frame 301.

The angle through which ratchet wheel 324 rotates is determined by the angular movement of driven member 316. Consequently, the movement of ratchet wheel 324 is commensurate to the denomination of the coin deposited in the device.

As successive coins are deposited in the device and the driver is operated, ratchet wheel 324 "stores credit" or adds up the denominations of the coins until a predetermined sum has been deposited to operate the vending mechanism.

To prevent repeated operation of driven member 316 after a single coin has been deposited, driver 303 normally is prevented from being moved alternately to the right and left until it has been moved to its limit in one direction or the other, by a spring-actuated pawl 307 pivotally mounted on frame 301 and engaging a rack 308 on plate 335 of driver 303. The pawl and rack are an ordinary expedient to prevent return movement of a toothed part until it has reached the extremities of its desired movement.

To accommodate slight jiggling movement to and fro of driver 303, particularly at the ends of its movement without moving ratchet wheel 324 and setting up false credits, pawl 323 is slotted at 341 to receive pin 342 and provides lost motion between driven member 316 and pawl 323. The pawl is urged by spring 325 toward ratchet wheel 324.

Figure 20:
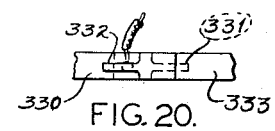
Figure 21:
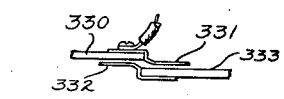
Figure 22:
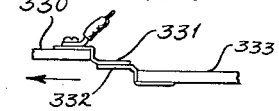

An arm 330 depends from driver 303 and mounts an electric contact 331 arranged to engage a contact 332 on an arm 333 adjustably attached to ratchet wheel 324. Contact 331 engages contact 332 only when driver 303 moves to the left and a predetermined sum of money has been deposited. When a predetermined sum of money has been deposited in the device and driver 303 is moved to the right, lost motion between driver 303 and ratchet wheel 324 delays rotation of ratchet wheel 324 and movement of its associated contact 332 into the path of contact 331 (Figure 19) until contact 331 has moved to the right past contact 332 and without engaging contact 332 (Figures 20 and 21). After rotation of ratchet wheel 324 and movement of its associated contact 332, as driver 303 moves to the left, contact 331 engages contact 332 (Figure 22) to complete an electric circuit operating a vending mechanism and release an article from the vending machine. The vending mechanism pivots an arm 309 which raises latch 329 and moves pawl 327 out of engagement with ratchet wheel 324 so that ratchet wheel 324 rotates in a counterclockwise direction and erases the accumulated credit.

The price of the vended article may be varied from one cent to twenty-five cents or any intermediate price by adjusting arm 333 relative to ratchet wheel 324 by a screw 340 extending through a slot 343 in ratchet wheel 324. The device as shown is adjusted to vend an article for seventeen cents.

In the embodiment of Figures 23–27, the coin device comprises a base 350 slidably mounting a driver 351 and a driven member 352. Driver 351 is urged to the left (Figure 23) by a tension spring 358 having one end attached to a pin 367 rigid with frame 350 and having the other end attached to a pin 368 on driver 351 and extending through a slot 369. Movement of driver 351 in each direction is limited by pin 368 engaging the ends of slot 369. Driver 351 has a handle 353 extending outwardly of base 350.

Driven member 352 has a series of shoulders 354, 355 and 356 extending toward driver 351 and arranged for engaging coins of quarter, nickel and dime denominations, respectively, when the coins are inserted in a slot 357 in the top of base 350 and driver 351 is moved to the right. Driven member 352 is urged to the left by a spring 359 having one end attached to a pin 370 rigid with base 350 and having the other end attached to a pin 371 on driven member 352 and extending through a slot 372 in base 350. Movement of driven member 352 toward driver 351 is limited by pin 371 engaging the end of slot 372.

A quarter or nickel deposited in slot 357 falls between driver 351 and driven member 352 onto a ledge 364, as indicated by N' in Figure 23. When driver 351 is moved to the right (Figure 24), the coin engages a projection 375 on driver 351; if the deposited coin is a quarter, it engages shoulder 354 on driven member 352, and if a nickel, it engages shoulder 355 on driven member 352. A dime deposited in slot 357 falls first on ledge 364 and, as the driver is moved to the right, an aperture 364a in ledge 364 moves beneath the dime before projection 375 can engage the dime and the dime falls from the position D' to position D'' (Figure 23), where further movement of driver 351 causes the dime to engage shoulder 356 on driven member 352. The space between projection 375 and ledge 364 is large enough to pass a dime but too small to pass a nickel or quarter. Driven member 352 moves through a predetermined distance determined by the shoulder engaged by the selected coin. Thus, driven member 352 moves a distance commensurate to the denomination of the deposited coin and may control a circuit for operating a coin changing machine or other apparatus.

Spring biased shedding arms 360 and 361 extend through slots 365 and 366, respectively, and are pivoted to a bracket 362 attached to the rear face of base 350. Shedding arms 360 and 361 yield upon forward movement of driver 351 and a coin and provide a positive stop for the coin as the driver returns to its starting position. Nickels and quarters are stripped from the device by shedding arm 360 and fall through a slot 373 in shoulder 356 and through a slot 374 in the bottom of base 350. Dimes are stripped from the device by shedding arm 361 and fall through slot 374. Shedding arms 360 and 361 prevent return movement of driver 351 until it is moved forwardly its full distance as determined by the denomination of the coin.

Any of the above described devices may be incorporated in conventional coin operated machines to control the operation of such machines. While the various mechanisms have been described as adapted to receive and be operated by United States coins, namely pennies, nickels, dimes, quarters and half-dollars, obvious modifications in the lengths of slots, lengths of travel of racks, etc., will adapt the mechanisms for use with coins of any other country or with coin-like tokens, slugs, or discs having an arbitrary value and the term "coin," when used in this specification, includes all such elements.

The construction of the device may be varied substantially without departing from the spirit of the invention and the exclusive use of those modifications coming within the scope of the claims is contemplated.

What is claimed is:

1. A device of the kind described including an electric circuit, with a switch, for controlling a vending mechanism or the like, two series of electric terminals, all of said terminals being insulated from each other, a pair of current conductors forming part of the circuit, one of said conductors being attachable at one end to any one of the terminals of one of said series, the other of said conductors being attachable at one end to any one of the terminals in the other series, the other ends of said conductors being attached to the poles of the circuit switch, a conductor with two contacts, each movable relative to the other and along the terminals of a respective series, and members movable respectively different distances by coins of different denominations deposited in the device, said members moving the contacts of the latter-mentioned conductor along the corresponding series of terminals according to the denomination of the coins deposited.

2. A device of the kind described including an electric circuit, with a switch, for controlling a vending mechanism or the like, a series of five electric terminals insulated from each other, another series of electric terminals insulated from each other, a conductor in said circuit connecting a selected one of the terminals in the first-mentioned series to one pole of said switch, a conductor in said circuit connecting a selected one of the terminals in the second-mentioned series to the other pole of said switch, a conductor in said circuit with contacts movable thereon relative to each other, means actuated by a penny inserted in the device for moving one of said contacts from one terminal to another along the series of five terminals, and means actuated by any coin of multi-penny value for moving the other of said contacts along as many terminals of the other series as the number of five-penny values represented by the coin.

3. A device of the kind described including an electric circuit, with a switch, for controlling a vending mechanism or the like, a series of five electric terminals insulated from each other, another series of electric terminals insulated from each other, a conductor in said circuit connecting a selected one of the terminals in the first-mentioned series to one pole of said switch, a conductor in said circuit connecting a selected one of the terminals in the second-mentioned series to the other pole of said switch, a conductor in said circuit with contacts movable thereon relative to each other, means actuated by a penny inserted in the device for moving one of said contacts from one terminal to another along the series of five terminals, and means actuated by a nickel for moving the other of said contacts from one terminal to another along the other series of terminals.

4. A device as described in claim 3 which includes a connection between said respective means effective upon the fifth successive operation of the first-mentioned means to move the second-mentioned contact from one terminal to another along the second-mentioned series of terminals.

5. In a device of the kind described, to be operated by a combination of unit denomination coins and multi-unit denomination coins, a driving member, means for effecting successive advancing movements of said member by means of a plurality of unit and multi-unit coins, a pawl on said member, a pair of toothed racks arranged side by side beneath said pawl, one of said racks normally being relatively close to said pawl and engageable by said pawl when said driving member is moved in said direction by a multi-unit coin, and the other rack normally being relatively remote from said pawl, means for shifting the normally remote rack closer to said pawl than said first-mentioned rack when said driving member is advanced by means of a unit coin, the number of teeth in said normally remote rack corresponding to the number of unit coins equal in value to the smallest multi-unit coin, and the tooth in said normally remote rack most distant from said pawl when an operation is started being deeper than the other teeth in said normally remote rack to accommodate the engagement of said pawl with a tooth in the other rack also when said normally remote rack has been fully advanced one less number of times as it has teeth.

6. A device as described in claim 5 which includes an individual detent for each of the racks, springs for retracting the racks when their respective detents are released, and means actuated by movement of the normally remote rack beyond the point when the pawl has engaged the deeper tooth for effecting the release of the detent for that rack.

7. In a device of the class described, a driver member, a pair of credit accumulators, means actuated by the use of a coin of unit denomination for operatively connecting said member to one of said accumulators and moving the same relative to the other accumulator, structure for operatively connecting said accumulator to the other accumulator when a pre-determined number of operations of the first-mentioned accumulator effects a maximum movement thereof, and means for operatively connecting said member to the latter-mentioned accumulator actuated by the use of a coin of multi-unit denomination.

8. In a device for coin control of a mechanism of the class described, a metallic frame, a driver slidable on said frame, a member reciprocable relative to said driver and movable different distances by the driver by the use of one or more coins of a given unit denomination inserted between the driver and the member, a metallic bar associated with said driver for slidably engaging said frame and provided with an electric contact, a second metallic bar associated with said driver and slidably engaging said frame and provided with an electric contact, springs urging said bars towards an initial position, each of said bars being provided with rack teeth, a pawl on said member engageable with said rack teeth, individual detents for the rack teeth on said bars for holding said bars in advanced position against said springs, and a mechanism-control electric circuit having a section with terminals insulated from said frame and adjustably positioned in the paths of movement of said contacts, said bars and contacts comprising another current conducting section of said circuit.

9. A device as described in claim 8 which includes means for advancing the second-mentioned bar relative to the terminals by movement of said first-mentioned bar after the latter has moved a predetermined distance from an initial position.

10. A device as described in claim 8 in which the rack teeth on the second-mentioned bar are engaged by the pawl on the first-mentioned bar after the latter has moved a predetermined distance from an initial position.

11. In a device of the kind described, a frame, a driving member movable thereon and having a shoulder, a part pivoted to said driving member and opposing said shoulder and including a projection, pivotal movement of said part relative to said member being determined by the size of a coin deposited in the device between said part and said shoulder, a series of slots in the frame corresponding in length to the denominations of different coins and being positioned to align with said projection when coins of various sizes determine the position of said part, driven members advanceable selectively by said driving member in accordance with the denomination of a coin deposited in the device and advanceable cumulatively by successive movements of said driving member in accordance with the denominations of successive coins deposited in the device, said driven members being connected electrically, and elements forming an electric circuit with spaced terminals, both of which terminals are contacted by said driven members only when said members are in respective predetermined positions.

12. In a device of the kind described, a frame, a driver movably mounted on said frame, a pair of driven members movably mounted on said frame, and means for selectively moving one of said driven members a given distance by said driver when a coin of unit denomination is deposited in the device and for moving the other of said driven members a given distance by said driver when a coin of multiple unit denomination is deposited in the device, means operative upon a predetermined number of successive movements of the unit coin driven member to engage said driver with the multi-unit coin driven member, and an electric circuit with terminals interconnected when the driven members are in predetermined positions.

13. A device as described in claim 12 which includes means controlled by the position of the unit coin driven member for actuating the multi-unit coin driven member when a number of unit coins equal in value to a multi-unit coin is deposited, and means automatically returning the unit coin driven member to its original position.

14. In a device of the kind described to be operated by a combination of unit denomination and multi-unit denomination coins, a driver, means for effecting successive advancing movements of said driver by a plurality of unit and multi-unit coins, a pawl on said driver, a pair of driven members adjacent said driver, each having a series of teeth, one of said members being engageable by said pawl when said driver is advanced by a multi-unit coin and the other member being engageable by said pawl when said driver is advanced by a unit coin, the number of teeth in said second-mentioned member corresponding to the number of unit coins equal in value to the smallest multi-unit coin, and the tooth in said second-mentioned member most distant from said pawl when an operation is started being deeper than the other teeth in said second-mentioned member to accommodate the engagement of said pawl with a tooth in the first-mentioned member also when said second-mentioned member has been advanced one less number of times than it has teeth.

15. A device as described in claim 14 which includes an individual detent for each of the driven members, springs for retracting the members to an initial position when their respective detents are released, and means actuated by movement of the second-mentioned driven member, beyond the point where the driver pawl has engaged the deeper tooth, effecting the release of the detent for the second-mentioned driven member.

16. A device of the kind described including a single electric circuit for controlling a vending mechanism or the like, two series of electric terminals, all of said terminals being insulated from each other, a driver, means for advancing said driver different distances by use of coins of unit and multi-unit denominations, a driven member advanceable cumulatively by successive advancing movements of said driver when successive unit denomination coins are used and having a contact movable along the terminals of one of said series, a driven member advanceable cumulatively by successive advancing movements of said driver when successive multi-unit coins are used and having a contact movable along the terminals of the other of said series, and means actuating the second-mentioned driven member by said driver upon the use successively of as many unit coins as equal the value of a multi-unit coin, said driven members and contacts comprising structure electrically connecting a selected terminal of one series with a selected terminal of the other series to complete said circuit when a predetermined total of coin units have been used to advance said driver.

17. In a device of the class described, an initially actuated member, a pair of credit accumulators arranged to be operated independently of each other by coins of unit and plural unit denominations respectively, means for operatively connecting said member to either one of said accumulators and moving the same bodily relative to the other accumulator according to whether a unit denomination coin or a plural unit denomination coin is utilized, structure operatively connecting the unit denomination accumulator to the plural unit denomination accumulator following a predetermined travel of the unit denomination accumulator, there being a single circuit for operating a machine controlled by the device, said circuit including a plurality of terminals interconnected only when the two accumulators are in predetermined, selected positions.

18. A device of the kind described including an electric circuit for controlling a vending mechanism or the like, two series of electric terminals, all of said terminals being insulated from each other, a pair of current conductors forming part of the circuit, one of said conductors being attachable at one end to any one of the terminals of one said series, the other of said conductors being attachable at one end to any one of the terminals in the other series, a conductor with two contacts, each movable relative to the other and along the terminals of a respective series, and members movable respectively different distances by coins of different denominations deposited in the device, said members moving the contacts of the latter-mentioned conductor along the corresponding series of terminals according to the denomination of the coins deposited.

19. A device as described in claim 5 which includes an individual detent for each of the racks, springs for retracting the racks when their respective detents are released, means actuated by movement of the normally remote rack beyond the point when the pawl has engaged the deeper tooth for effecting the release of the detent for that rack, and means actuated automatically when the racks are in a predetermined position for effecting release of the detents for both racks.

20. A device as described in claim 2 which includes a connection between said respective means effective upon the fifth successive operation of the first-mentioned means to move the second-mentioned contact from one terminal to another along the second-mentioned series of terminals.

21. A device as described in claim 2 which includes a connection between said respective means effective upon the fifth successive operation of the penny actuated means to move the second-mentioned contact from one terminal to another along the second-mentioned series of terminals, there being a detent for holding each of said movable contacts in advanced position, elements actuated by the movement of the penny actuated contact following its fourth successive operation for effecting the release of the detent for that contact, and means for returning the penny actuated contact to its initial position when its detent is released.

22. A device as described in claim 2 which includes a connection between said respective means effective upon the fifth successive operation of the penny actuated means to move the second-mentioned contact from one terminal to another along the second-mentioned series of terminals, there being a detent for holding each of said movable contacts in advanced position, elements actuated by the movement of the penny actuated contact following its fourth successive operation for effecting the release of the detent for that contact, and means for returning both contacts to their initial positions when their respective detents are released.

JULES A. FREMON.

References Cited in the file of this patent

UNITED STATES PATENTS

| Number | Name | Date |
|---|---|---|
| 950,081 | Smiley et al. | Feb. 22, 1910 |
| 1,433,444 | Ziegler | Oct. 24, 1922 |
| 1,799,056 | Miller | Mar. 31, 1931 |
| 1,867,429 | Walker | July 12, 1932 |
| 1,946,371 | Walker | Feb. 6, 1934 |
| 2,032,228 | Rowe | Feb. 25, 1936 |
| 2,171,492 | Errera | Aug. 29, 1939 |
| 2,183,611 | Goodman | Dec. 19, 1939 |
| 2,263,738 | Moos | Nov. 25, 1941 |
| 2,271,397 | McDermott | Jan. 27, 1942 |
| 2,354,896 | Weiler | Aug. 1, 1944 |
| 2,433,689 | Fry | Dec. 30, 1947 |

FOREIGN PATENTS

| Number | Country | Date |
|---|---|---|
| 381,787 | Germany | Sept. 24, 1923 |
| 375,264 | Great Britain | Dec. 24, 1930 |
| 354,418 | Great Britain | Aug. 13, 1931 |